United States Patent
Schmidt et al.

(10) Patent No.: US 8,382,146 B2
(45) Date of Patent: Feb. 26, 2013

(54) VEHICLE COUPLING FOR PRODUCING A MECHANICAL CONNECTION BETWEEN A FIRST AND SECOND VEHICLE

(75) Inventors: Dirk Schmidt, Limburg (DE); José Manuel Algüera Gallego, Aschaffenburg (DE)

(73) Assignee: Jost-Werke GmbH, Neuisenburg (DE)

( * ) Notice: Subject to any disclaimer, the term of this patent is extended or adjusted under 35 U.S.C. 154(b) by 140 days.

(21) Appl. No.: 12/864,128

(22) PCT Filed: Jan. 22, 2009

(86) PCT No.: PCT/EP2009/050701
§ 371 (c)(1),
(2), (4) Date: Sep. 24, 2010

(87) PCT Pub. No.: WO2009/092755
PCT Pub. Date: Jul. 30, 2009

(65) Prior Publication Data
US 2011/0025019 A1    Feb. 3, 2011

(30) Foreign Application Priority Data
Jan. 26, 2008  (DE) .................. 10 2008 006 203

(51) Int. Cl.
*B62D 53/08* (2006.01)
(52) U.S. Cl. ............ 280/433; 280/438.1; 280/439; 280/441.1
(58) Field of Classification Search .......... 280/433, 280/438.1, 439, 441.1
See application file for complete search history.

(56) References Cited

U.S. PATENT DOCUMENTS

| 3,704,924 A | 12/1972 | Lowry |
| 3,742,656 A | 7/1973 | Amos .............................. 51/376 |
| 3,859,821 A | 1/1975 | Wallace ........................ 64/11 R |
| 3,924,909 A | 12/1975 | Kent et al. |
| 4,451,245 A | 5/1984 | Hornig et al. ................. 464/181 |
| 4,752,081 A | 6/1988 | Reeners et al. |
| 4,801,159 A | 1/1989 | Sehorn ............................ 285/55 |
| 5,263,856 A | 11/1993 | Huehn et al. |
| 5,431,424 A | 7/1995 | Colwell ........................ 280/433 |
| 5,522,613 A | 6/1996 | Heeb ............................ 280/433 |
| 5,620,770 A | 4/1997 | Cork ............................ 428/121 |
| 5,622,767 A | 4/1997 | Cork |
| 6,058,673 A | 5/2000 | Wycech |

(Continued)

FOREIGN PATENT DOCUMENTS
DE   197 20 109 A1   11/1997
DE   198 14 275 A1   10/1999
(Continued)

OTHER PUBLICATIONS

International Search Report and Written Opinion, dated Apr. 29, 2009, pp. 1-9, International Patent Application No. PCT/EP2009/050701, European Patent Office, The Netherlands.

*Primary Examiner* — Tashiana Adams
*Assistant Examiner* — Marlon Arce
(74) *Attorney, Agent, or Firm* — Brinks Hofer Gilson & Lione

(57) ABSTRACT

A vehicle coupling for producing a mechanical connection between a first and a second vehicle including a coupling body (1) in which at least one structural area (2) of the coupling body (1) is made of a metallic foam (3).

14 Claims, 3 Drawing Sheets

U.S. PATENT DOCUMENTS

| | | | |
|---|---|---|---|
| 6,190,263 B1 | 2/2001 | Kimoto et al. | 464/181 |
| 6,476,322 B1 | 11/2002 | Dunne et al. | 174/68.1 |
| 6,635,175 B2 | 10/2003 | Stankowski | 210/232 |
| 6,837,365 B1 | 1/2005 | Forbin | |
| 6,986,713 B2 | 1/2006 | Dine et al. | 464/181 |
| 7,213,379 B2 | 5/2007 | Carlson et al. | |
| 7,547,034 B2 | 6/2009 | Hungerink et al. | |
| 7,905,072 B2 * | 3/2011 | Verhaeghe | 52/783.1 |
| 2006/0170191 A1 | 8/2006 | Hungerink et al. | 280/433 |
| 2006/0249927 A1 | 11/2006 | Metternich et al. | 280/515 |
| 2009/0212533 A1 * | 8/2009 | Verhaeghe | 280/423.1 |
| 2011/0044755 A1 | 2/2011 | Alguera Gallego et al. | |
| 2011/0140402 A1 * | 6/2011 | Lanting et al. | 280/763.1 |

FOREIGN PATENT DOCUMENTS

| | | |
|---|---|---|
| DE | 102 60 531 A1 | 7/2004 |
| EP | 0 927 590 A2 | 7/1999 |
| WO | WO2006/117395 * | 9/2006 |

* cited by examiner

VEHICLE COUPLING FOR PRODUCING A MECHANICAL CONNECTION BETWEEN A FIRST AND SECOND VEHICLE

BACKGROUND

The invention relates to a vehicle coupling for establishing a mechanical connection between a first and a second vehicle, wherein the vehicle coupling includes a coupling body.

The coupling body and the components which cooperate with same are usually produced by in a casting process, using cast steel or spheroidal graphite iron, or also by welding sheet metal parts. The resulting robust design is necessary under the expected high operating forces in order to avoid deformations and ensure maximum wear protection. However, these designs used heretofore have the disadvantage that the nominal weight of the vehicle coupling is very high, which in turn disadvantageously affects the curb weight of the vehicle, resulting in a correspondingly lower available payload for a specified maximum allowable total weight. A further disadvantage of cast components lies in the risk of formation of inclusions and shrink holes, particularly in regions where localized aggregations of metal are necessary.

Consequently, the object of the invention is to provide a vehicle coupling having a nominal weight that is much lower than known vehicle couplings.

SUMMARY

The object is achieved according to the invention by using a vehicle coupling in which at least one structural area of the coupling body is made of a metal foam. The essential advantage of the metal foam lies in the very high strength, with a unit weight that is much lower than steel.

The metal foam is produced from a blowing agent and a metal powder which is added thereto, the metal powder usually being composed of aluminum or steel. After the blowing agent and metal powder are combined and mixed, a first shaping process is carried out, followed by foaming. The foam structure results in an extremely low bulk density with only slightly reduced strength of the metal foam.

The coupling body preferably includes a coupling plate of a fifth wheel coupling. Alternatively, the coupling body may be formed from a coupling jaw of a trailer or pin coupling.

It has proven to be advantageous when the metal foam has a complete or partial coating. The vehicle coupling or the correspondingly designed areas made of metal foam have a comparatively rough surface, which may be smoothed by a coating. In addition, the coating may increase corrosion resistance. The coating may be formed from a filling lacquer, for example.

The coating may also be provided by extrusion coating or foam enclosure with a plastic. This coating may be applied to all or part of the vehicle coupling.

In particular, individual components may be fully encapsulated by the coating.

The structural area is advantageously formed in a sandwich design. The sandwich design is a design in which multiple layers having different characteristics are embedded in a material. As a construction method, the sandwich design refers to a form of lightweight construction in which the components are made of force-absorbing cover layers which are spaced apart by means of a relatively soft, usually lightweight, core material. These parts are very resistant to bending and buckling while having a low weight. The core material transmits shear forces which occur, and supports the cover layers.

In the sandwich design the metal foam forms the core, which is joined to at least one cover layer made of steel and/or plastic and/or aluminum. At locations where a closed-pore surface is required, for example to achieve low coefficients of friction, customary sheet steel or optionally also a plastic layer should be used.

As an alternative or in addition to the sandwich design, the structural area advantageously includes a support element made of metal foam which is provided on the coupling body. A "support element" is understood to mean a rib structure which reinforces the coupling plate or coupling jaw. For a fifth wheel coupling, this rib structure is situated on the underside of the coupling plate, and for a coupling jaw, on the exterior of the conically expanded insertion opening.

The support element is advantageously connected to the coupling body by means of an adhesive layer. The adhesive layer may be provided using a plastic compound which preferably is fiber-reinforced.

Thermoplastics or duroplastics are suitable materials for the plastic compound. A thermoplastic plastic deforms when heated, and maintains its shape upon cooling. The most well-known thermoplastics are polypropylene, polyethylene, polyester, polyvinyl chloride, and polyamide. Duroplastics, also referred to as duromers, are plastics which can no longer be deformed after hardening. Duroplastics are hard, glass-like polymeric materials which are fixedly crosslinked in three dimensions via primary chemical bonds. The crosslinking is achieved during mixing of precursors having branching sites, and is activated either chemically at room temperature, using catalysts, or thermally at high temperatures.

A plastic foam in particular may also be used as a plastic compound. Likewise, use of a metal foam is particularly well suited for producing an adhesive layer.

Further possibilities for connecting the support element to the coupling body are thermal joining, or a screw or rivet connection.

Due to the high flexural strength, according to one preferred embodiment the metal foam is situated in a section of the coupling body located in the force flow.

The metal foam is advantageously provided with a bearing point and/or fastening hole. The bearing points are provided on a fifth wheel coupling at oppositely situated lateral positions for supporting the coupling plate on bearing blocks located therebeneath. The fastening holes may be designed as a threaded insert part, for example.

BRIEF DESCRIPTION OF THE DRAWINGS

For better understanding, the invention is explained in greater detail below with reference to five figures, which show the following.

DESCRIPTION OF PREFERRED EMBODIMENTS

Figure 1:
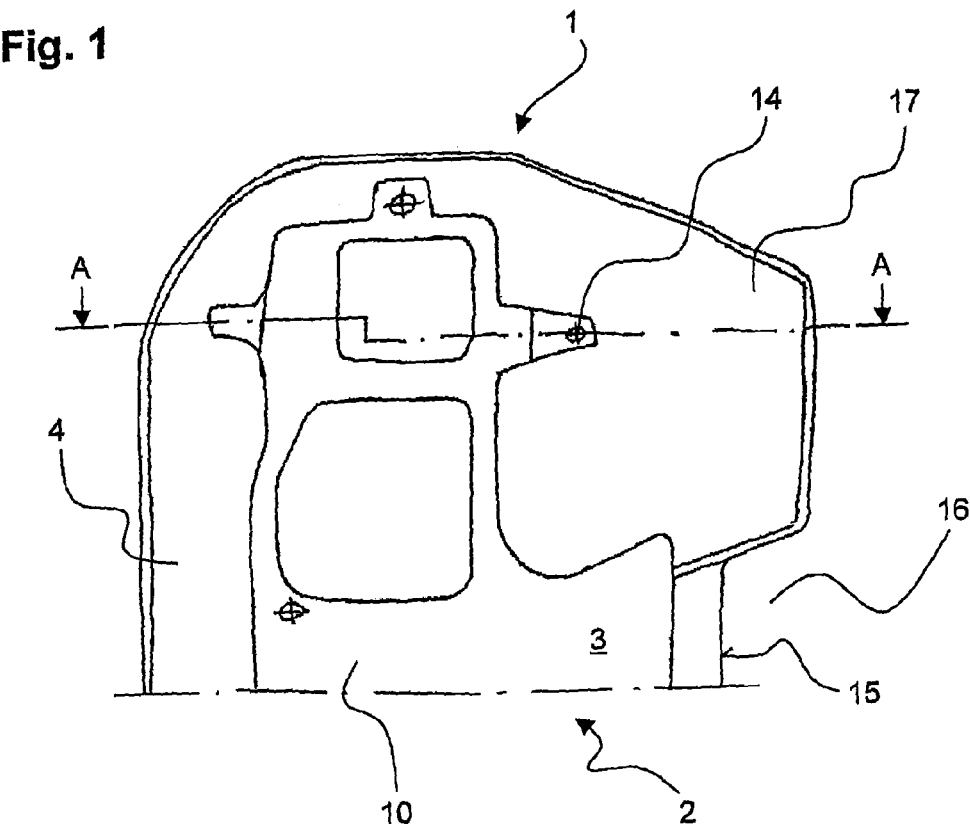
FIG. 1: shows a partial view of the bottom of a coupling plate of a fifth wheel coupling.

FIG. 1 shows a bottom view of a coupling plate 4 of a fifth wheel coupling, for which the invention is explained as a representative for all coupling bodies 1.

On its rear side 15 the coupling plate 4 has an insertion opening 16 in which a king pin of a trailer (not shown) may be inserted into the fifth wheel coupling in a customary manner. The insertion opening 16 is delimited on both sides by a coupling horn 17, only the right coupling horn 17, viewed in the direction of travel, being visible in the illustration of FIG. 1.

In driving mode, the underside of the trailer (also not shown) is supported on the bearing region 18 (see FIG. 2) of the coupling plate 4. Thus, in this bearing region 18 considerable forces are introduced into the coupling plate 4. So that the entire coupling plate 4 does not have to be provided with a great material thickness and a correspondingly high weight, a structural area 2 in the form of a support element 10 made of metal foam 3, which projects downward with respect to the coupling plate 4, is situated on the underside 19 (see FIG. 2) of the coupling plate 4. One of the two mirror-symmetrical bearing points 13 which supports the coupling plate 4 on bearing blocks (not illustrated) is shown on the support element 10 made of metal foam 3.

The support element 10 includes a base plate 10a which extends essentially horizontally, and on which vertical wall sections 10b are provided.

Figure 2:
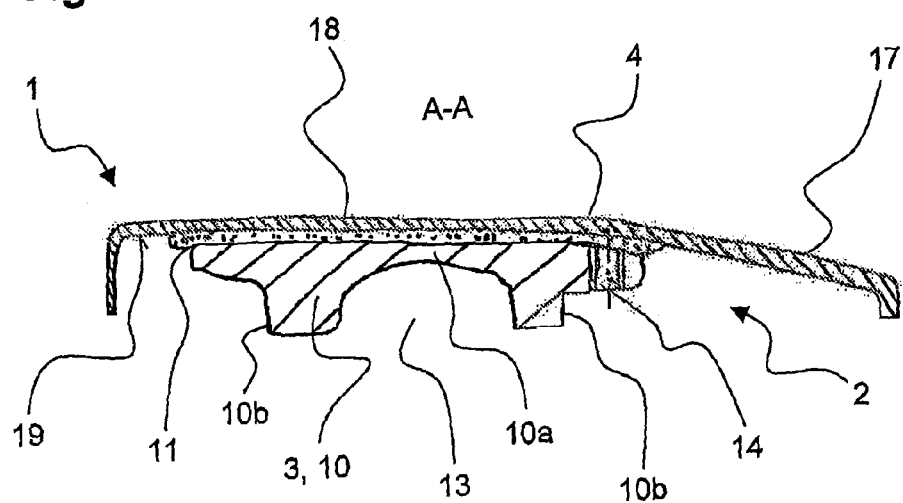
FIG. 2: shows a cross section along section line A-A in FIG. 1, according to a first embodiment having a support element glued to the coupling plate.

As shown in FIG. 2, the support element 10 is glued beneath the coupling plate 4 by means of an adhesive layer 11. The adhesive layer 11 is essentially limited to the contact area of the support element 10 with respect to the coupling plate 4. The metal foam 3 of the support element 10 allows a fastening hole 14, for example, to be introduced in a particularly easy manner. Additional units or also components of the closure mechanics may then be screwed into this fastening hole and to the coupling body 1.

Figure 3:
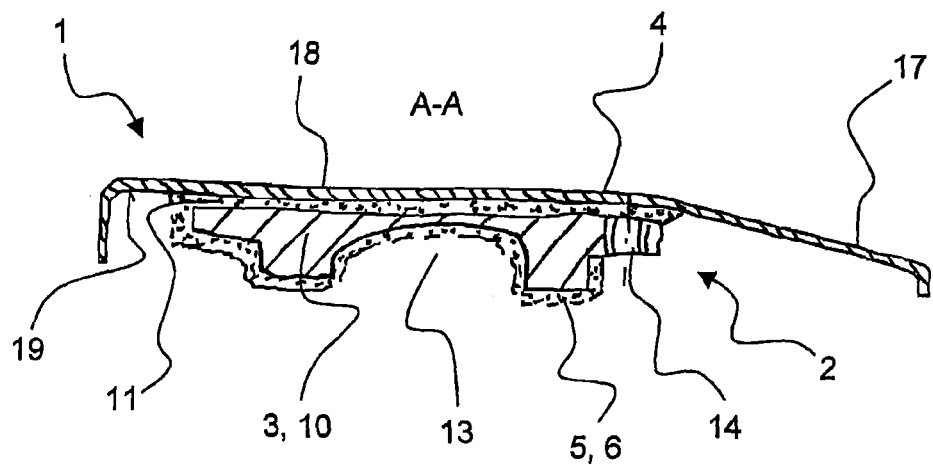
FIG. 3: shows a cross section along section line A-A in FIG. 1, according to a second embodiment having a support element provided with a foam enclosure.

FIG. 3 shows another embodiment in which the support element 10 next to the adhesive layer 11 is provided with a coating 5. The coating 5 is applied as a foam enclosure 6, and almost completely encloses the support element 10. The foam enclosure 6 is omitted in only one area around the fastening hole 14, so that at that location the metal foam 3 forms an externally accessible surface. This surface made of metal foam 3 allows higher surface pressures for the components which are to be screwed on at the fastening hole 14.

Figure 4:
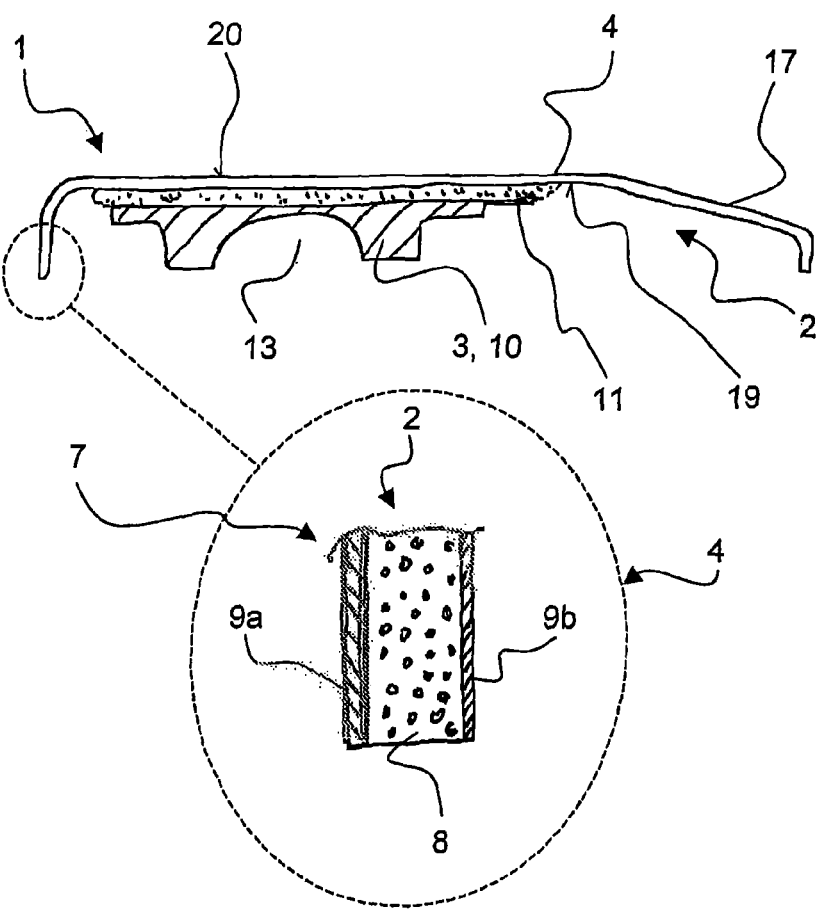
FIG. 4: shows a cross section along section line A-A in FIG. 1, according to a third embodiment having a coupling plate with a sandwich design.

FIG. 4 illustrates another embodiment having a coupling plate 4 in a sandwich design 7. The top side 20 of the coupling plate 4 has a sheet metal plate as an upper cover layer 9a to ensure a resistant bearing region 18 having a low coefficient of friction. A trailer plate (not shown) which is supported thereon is thus able to slide on the bearing region 18 with low wear.

The metal foam 3 has been introduced directly beneath the upper cover layer 9a as the core 8 of the sandwich design, and after hardening forms a positive-fit connection with the cover layer 9a. The sandwich design 7 also has a lower cover layer 9b, which likewise adheres directly to the metal foam 3. The lower cover layer 9b may in particular be a plastic layer.

The lower cover layer 9b is joined to the additional support element 10 made of metal foam 3 by means of an adhesive layer 11. In this embodiment as well, a completely cast-in or foamed attachment of the support element 10 is possible.

Figure 5:
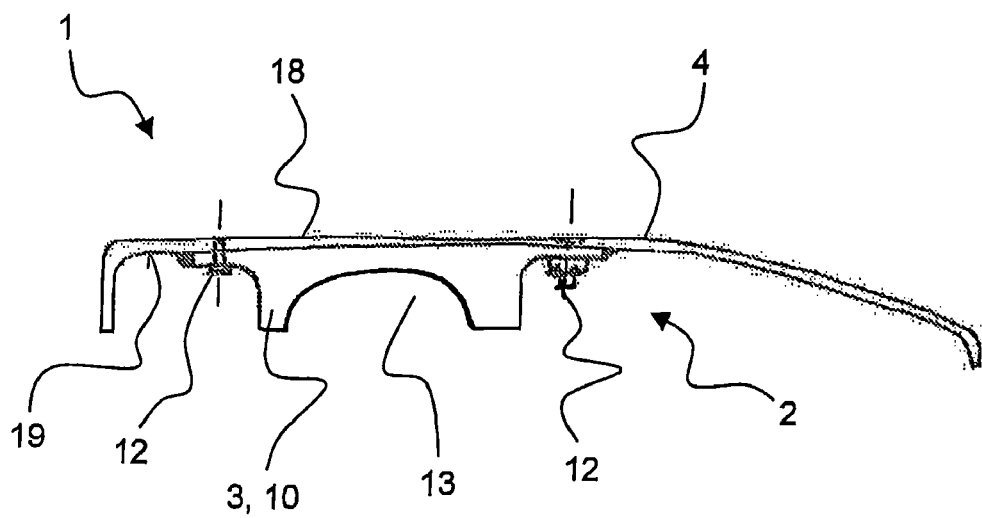
FIG. 5: shows a cross section along section line A-A in FIG. 1, according to a fourth embodiment having a support element which is screwed to the coupling plate.

FIG. 5 shows an alternative attachment of the support element 10 to the coupling plate 4 by means of multiple connecting elements, for which screws 12 are illustrated by way of example. These connecting elements pass through the coupling plate 4 in the vertical direction, and are fixedly held to the underside 19 by means of a nut. In this embodiment an adhesive layer 11 may be dispensed with entirely.

LIST OF REFERENCE NUMERALS

1 Coupling body
2 Structural area
3 Metal foam
4 Coupling plate
5 Coating
6 Foam enclosure
7 Sandwich design
8 Core
9a Upper cover layer
9b Lower cover layer
10 Support element
10a Base plate
10b Vertical wall section
11 Adhesive layer
12 Screw
13 Bearing point
14 Fastening hole
15 Rear side
16 Insertion opening
17 Coupling horn
18 Bearing region
19 Underside
20 Top side

The invention claimed is:

1. Vehicle coupling for establishing a mechanical connection between a first and a second vehicle, wherein the vehicle coupling includes a coupling body (1), characterized in that at least one structural area (2) of the coupling body (1) is made of a metal foam (3), and the metal foam (3) is provided with a bearing point (13) and/or fastening hole (14).

2. Vehicle coupling according to claim 1, characterized in that the coupling body (1) includes a coupling plate (4).

3. Vehicle coupling for establishing a mechanical connection between a first and a second vehicle, wherein the vehicle coupling includes a coupling body (1), characterized in that the coupling body (1) includes a coupling jaw, and at least one structural area (2) of the coupling body (1) is made of a metal foam (3).

4. Vehicle coupling according to any one of claim 1, 2, or 3, characterized in that the metal foam (3) has a complete or partial coating (5).

5. Vehicle coupling according to claim 4, characterized in that the coating (5) is formed from a filling lacquer.

6. Vehicle coupling according to claim 4, characterized in that the coating (5) is provided by extrusion coating or foam enclosure (6) with a plastic.

7. Vehicle coupling according to claim 1, characterized in that the structural area (2) includes a support element (10) made of metal foam (3) which is provided on the coupling body (1).

8. Vehicle coupling according to claim 7, characterized in that the support element (10) is connected to the coupling body (1) by means of an adhesive layer (11).

9. Vehicle coupling according to claim 7, characterized in that the support element (10) is connected to the coupling body (1) by thermal joining.

10. Vehicle coupling according to claim 7, characterized in that the support element (10) is connected to the coupling body (1) by means of screws (12) or rivets.

11. Vehicle coupling according to claim 1, characterized in that the metal foam (3) is situated in a section of the coupling body (1) located in the force flow.

12. Vehicle coupling for establishing a mechanical connection between a first and a second vehicle, wherein the vehicle coupling comprises a coupling body (1), at least one structural area (2) of the coupling body (1) is made of a metal foam (3), the coupling body comprises a coupling plate (4) of a fifth wheel coupling, and the coupling plate (4) comprises an opening (16) configured to receive a portion of the second vehicle.

13. Vehicle coupling according to claim 12, characterized in that the structural area (2) is formed in a sandwich design (7).

14. Vehicle coupling according to claim 13, characterized in that in the sandwich design (7) the metal foam (3) forms the core (8), which is joined to at least one cover layer (9*a*, 9*b*) made of steel and/or plastic and/or aluminum.

* * * * *